Oct. 12, 1943.    E. T. RODGERS    2,331,801
INTERNAL COMBUSTION ENGINE
Filed Dec. 12, 1939    7 Sheets-Sheet 2

INVENTOR.
Edward T. Rodgers
BY Brown & Jones
ATTORNEYS

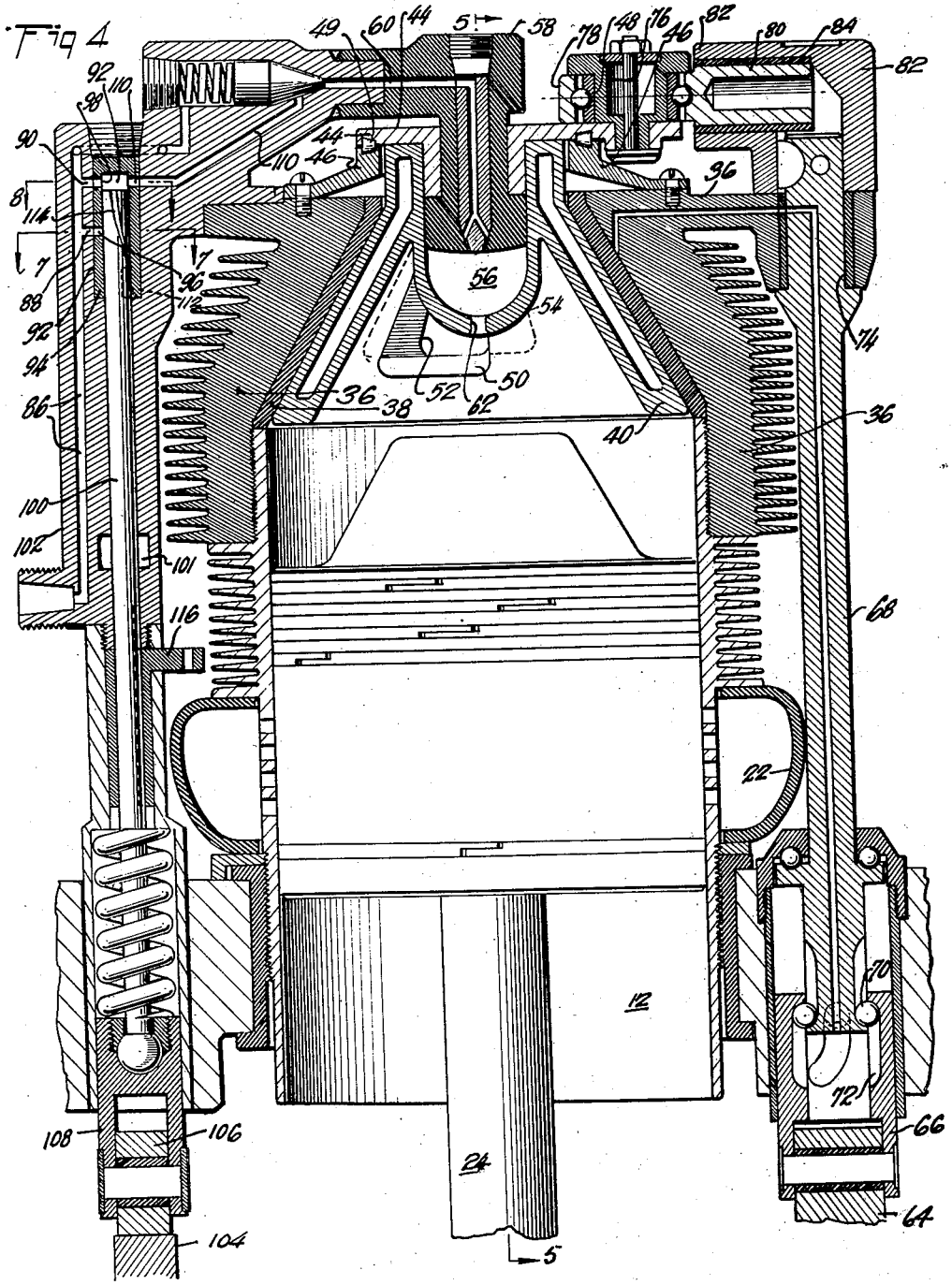

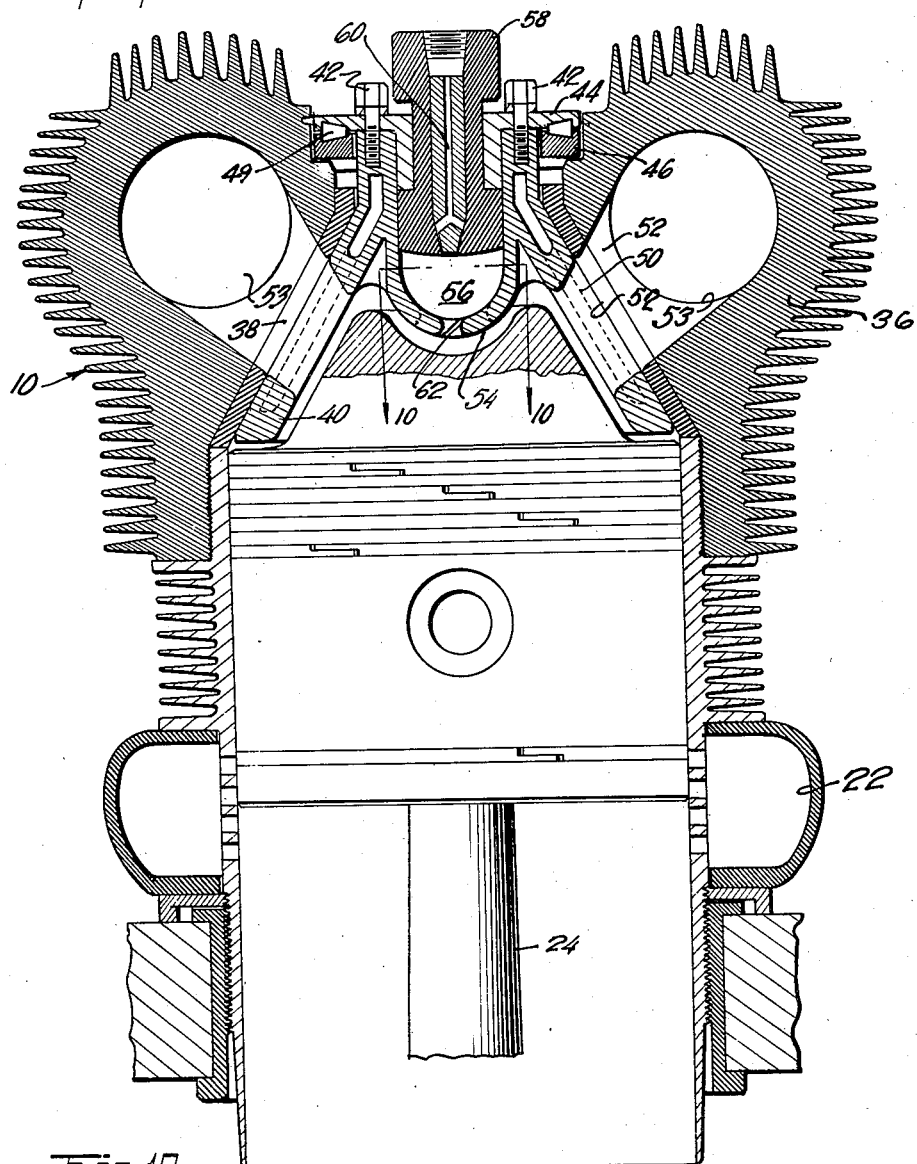
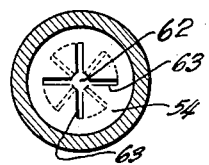

Oct. 12, 1943.  E. T. RODGERS  2,331,801
INTERNAL COMBUSTION ENGINE
Filed Dec. 12, 1939  7 Sheets-Sheet 6

INVENTOR.
Edward T. Rodgers
BY Brown & Jones
ATTORNEYS

Oct. 12, 1943.   E. T. RODGERS   2,331,801
INTERNAL COMBUSTION ENGINE
Filed Dec. 12, 1939   7 Sheets-Sheet 7
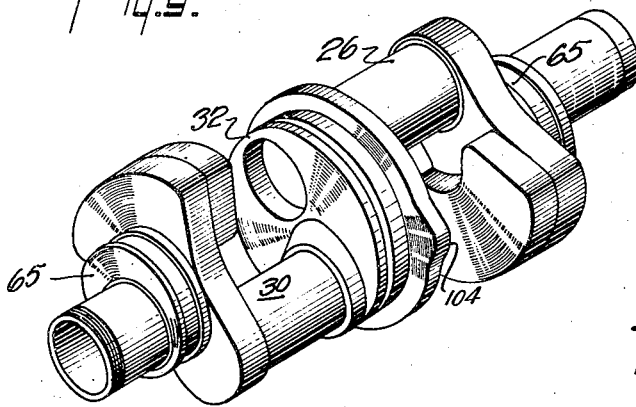
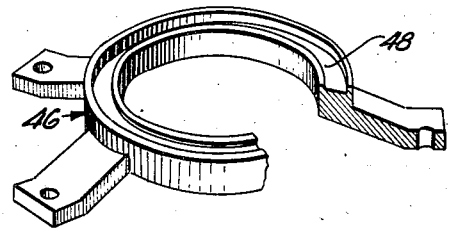
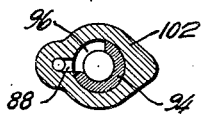
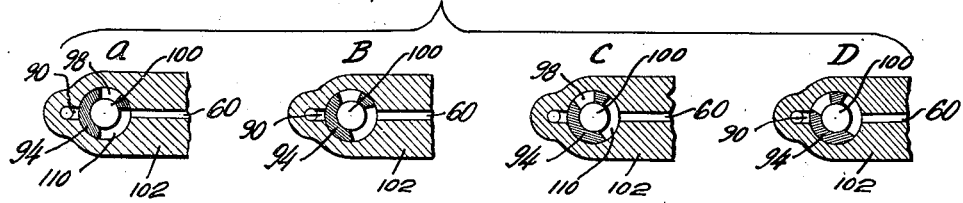
INVENTOR.
Edward T. Rodgers
BY Brown & Jones
ATTORNEYS Patented Oct. 12, 1943

2,331,801

UNITED STATES PATENT OFFICE 2,331,801

INTERNAL COMBUSTION ENGINE

Edward T. Rodgers, New York, N. Y., assignor, by mesne assignments, to Marie Minnie Orr Rodgers, Application December 12, 1939, Serial No. 308,858

9 Claims. (Cl. 123—190)

This invention relates to an internal combustion engine and more specifically to certain accessories therefor.

In general, it is an object of the invention to provide a device of the character described which will efficiently perform the purposes for which it is intended, which is simple and economical of construction, which can be expeditiously, conveniently and safely manipulated, and which can be readily manufactured and assembled.

Another object of the invention is to provide an internal combustion engine with an oscillant valve and/or with a valve having a precombustion chamber integral therewith with or without helical passageways between the chamber and the remainder of the valve; to provide such a valve with means for causing it to undergo rapid movement at predetermined times.

Another object is to provide a pump for injecting fuel at high pressure into a combustion engine.

Other objects of the invention will in part be obvious and will in part appear hereinafter.

The invention accordingly comprises the features of construction, combination of elements and arrangement of parts which will be exemplified in the construction hereinafter set forth and the scope of the application of which will be indicated in the claims.

For a fuller understanding of the nature and objects of the invention, reference should be had to the following detailed description, taken in connection with the accompanying drawings, in which:

Fig. 4 is a sectional and somewhat enlarged view of the elements shown in the upper right hand corner of Fig. 3;

Fig. 5 is a sectional view taken along the line 5—5 of Fig. 4;

Fig. 7 is a section of a detail, taken along the line 7—7 of Fig. 4;

Fig. 8 is a series of sections, taken along the line 8—8 of Fig. 4, at different positions of the elements there shown;

Fig. 9 is a perspective view of the crank shaft shown in Fig. 3;

Fig. 10 is a sectional view of a portion of the precombustion chamber taken along the line 10—10 of Fig. 5; and Fig. 11 is a perspective view of the valve-supporting member of Figs. 3 and 4.

Figure 1:
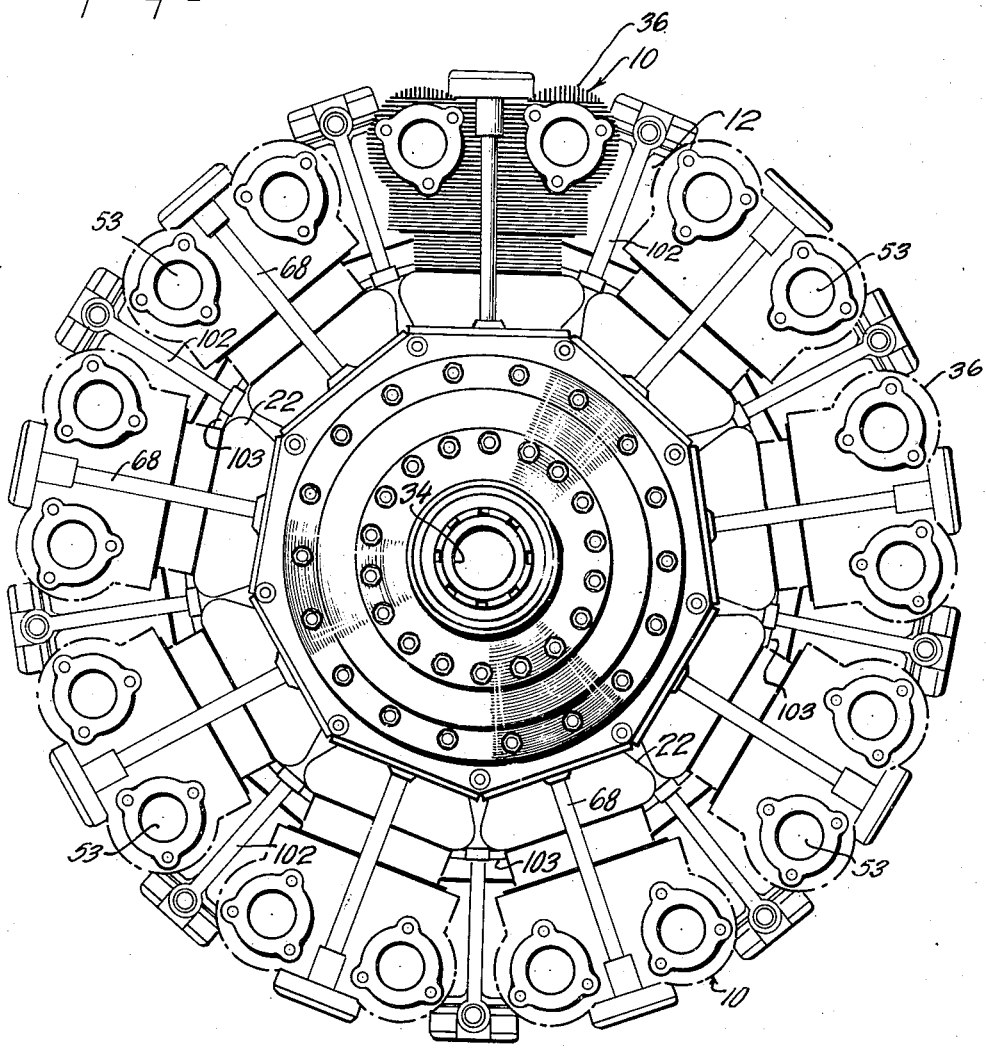
Figure 1 is a front view, in elevation and partly in section, of a machine embodying one form of the invention.
Figure 2:
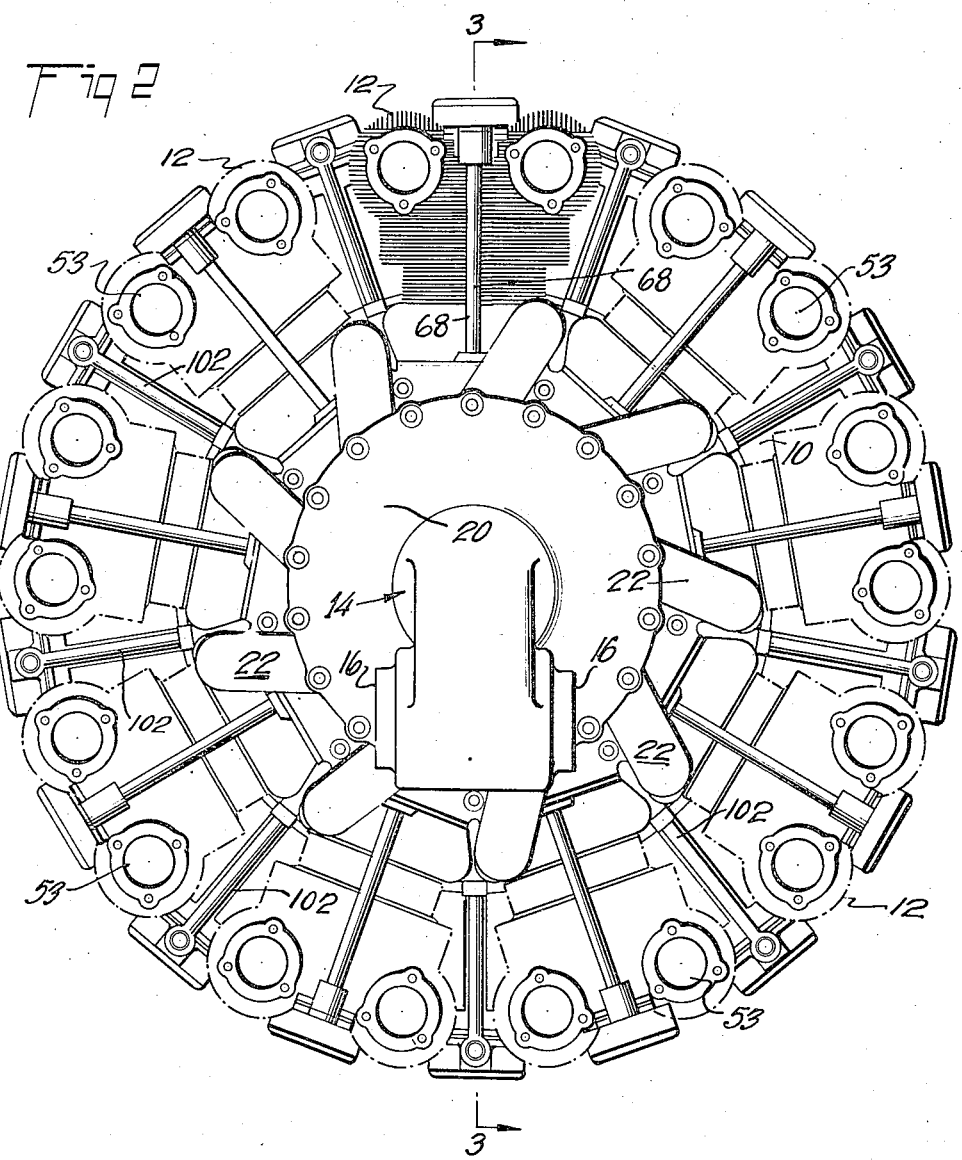
Fig. 2 is a similar view of the rear of the machine shown in Fig. 1.
Figure 3:
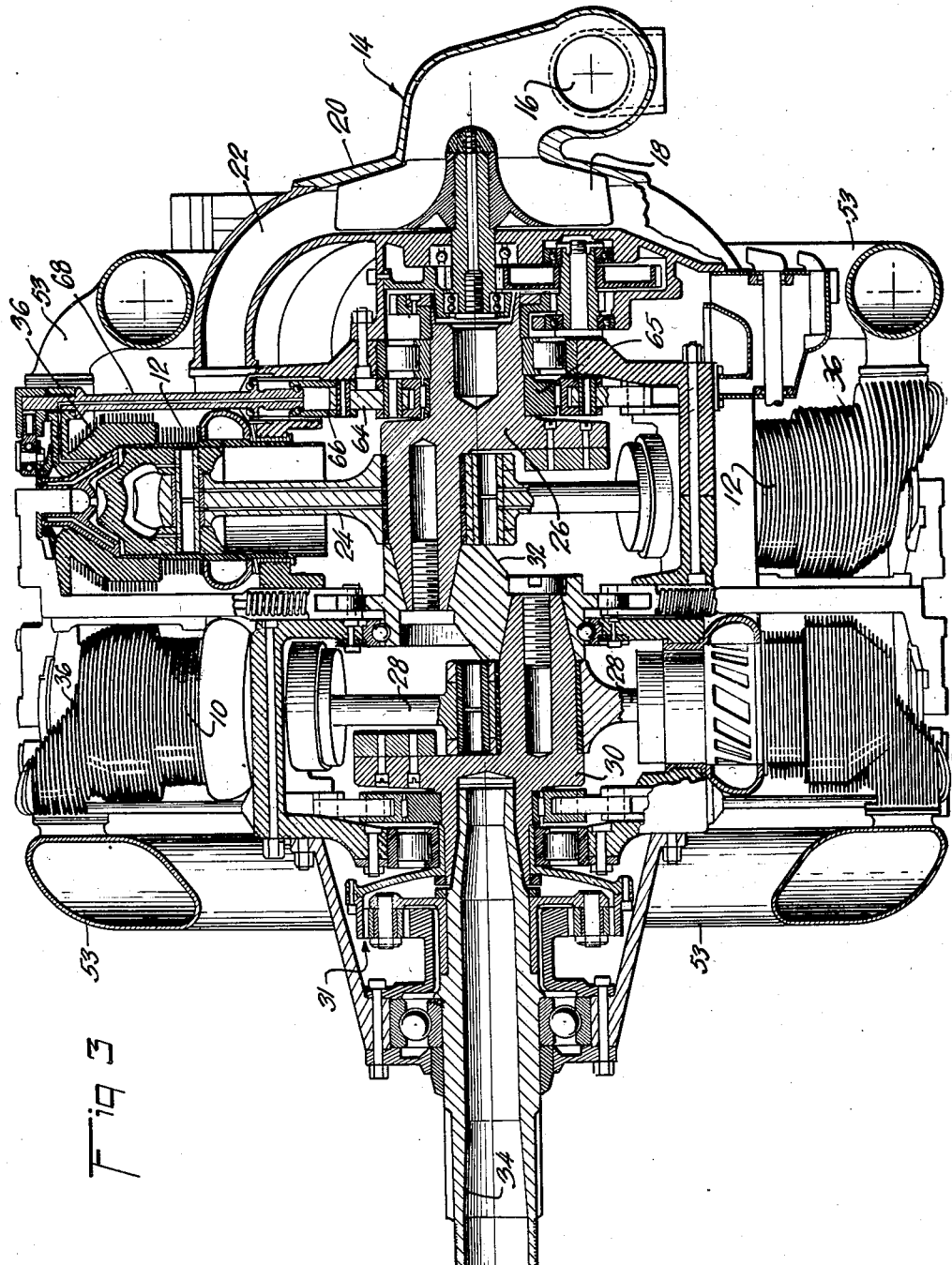
Fig. 3 is a view, in elevation and in section, and taken along the line 3—3 of Fig. 2, of the machine shown in Figs. 1 and 2.
Figure 6:
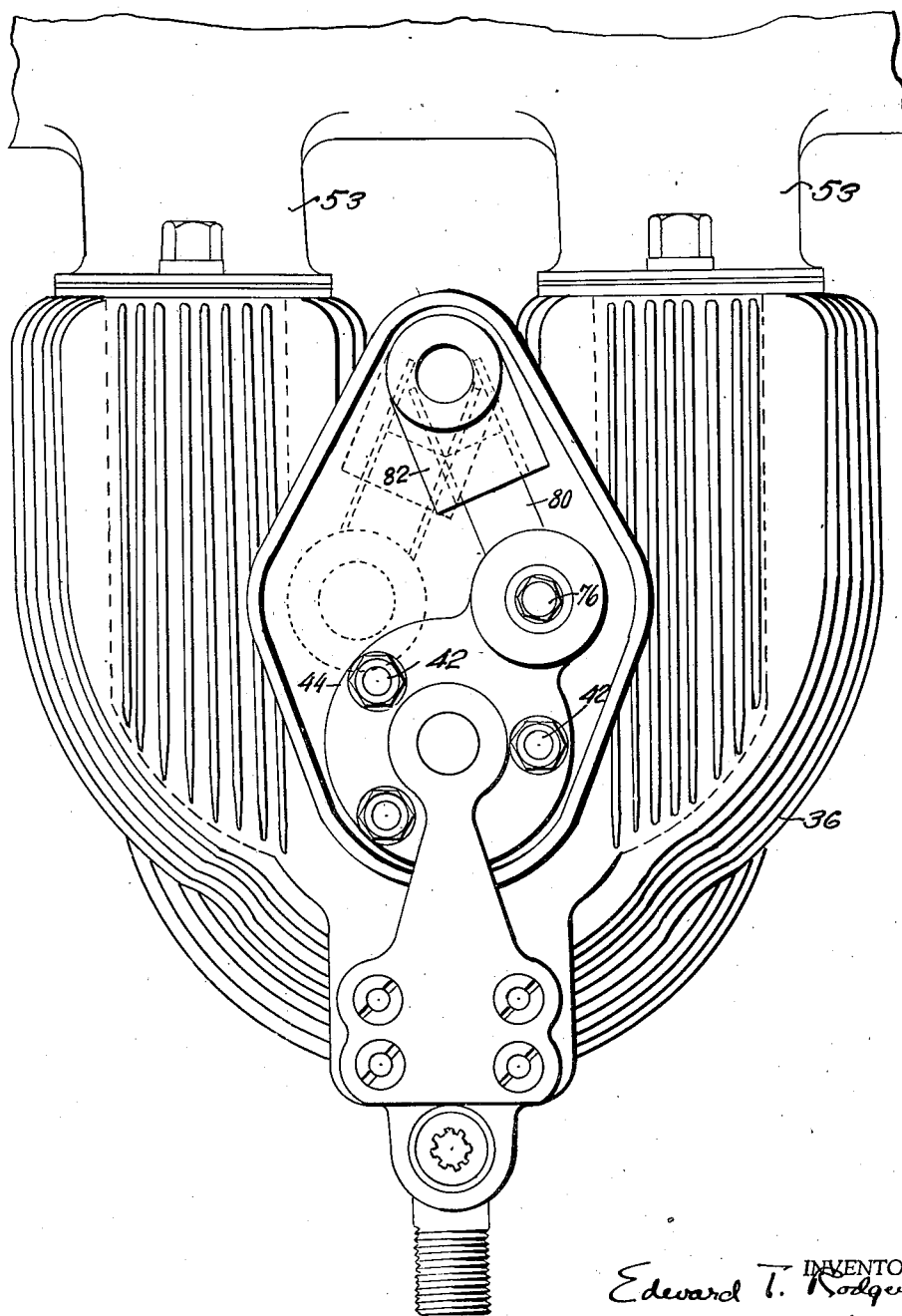
Fig. 6 is a plan view of the machine shown in Fig. 1 but with valve cover plate removed.

In the drawings, 10 denotes a plurality of cylinders arranged radially in a plane about a central shaft. 12 denotes a second plurality of cylinders arranged radially in a plane behind the first-mentioned plane, the alternate cylinders of the two pluralities being angularly staggered. A supercharger 14 receives air through inlet 16. The air is propelled by impeller 18 in scroll case 20 to a plurality of conduits 22. The latter lead to the aspiration ports in the cylinders.

Each rear cylinder is provided with a piston rod 24 fixed at its central end to the rear element 26 of the crank shaft. Similarly piston rods 28 in each of the front cylinders are fixed to the front element 30 of the crankshaft, there being a central crank shaft element 32 connecting elements 26 and 30. The output shaft 34 is attached to shaft element 30 through reduction gears 31.

Each cylinder is provided with a head 36, generally conical in shape, on the inner surface of which there is a circumambiently arranged valve seat structure, more specifically a conical valve seat 38 up against which is held the conical valve 40 by bolts 42 which support the valve from and against annular cap 44. The latter sits over an annular tensioning member 46 (see Fig. 11) having an annular raceway 48 on the upper surface thereof in which frictionless bearings 49 ride. The valve is provided with ports 50 which register with the cylinder head ports 52 for certain positions of the valve. Exhaust pipes 53 lead away from ports 52.

There is a central inwardly extending dome 54 which is integral with or permanently attached to each valve 40. The interior of the dome forms a precombustion chamber 56 the outer hole of which is formed for the fuel-nozzle elements 58 through which passages 60 pass, fuel being supplied through the latter. There is a central opening 62 through the dome into the cylinder. It is parallel to the cylinder axis and from it extend helical disposed slots 63 (see Fig. 10) which open on one side of the dome into the cylinder and, on the other side, into the precombustion chamber. Thus as is apparent from Figs. 4 and 5 the skirt or skirt-shaped portion of the conical valve 40 is arranged circumambiently of the precombustion chamber dome 54 and is spaced therefrom as shown with valve port openings 50 arranged in circumambiently spaced relation with respect to each other and located opposite the discharge orifice 62.

Means are provided to cause the valve to undergo a rapid oscillating movement at certain predetermined times relative to the position of the pistons and crank shaft. Thus, links 64 may be operated by a conventional excentric 65 on the rear shaft element 26. There is one such link for each cylinder. Each link causes a radial motion in its respective and connected sleeve 66. There is a shaft 68 for each cylinder leading radially away from the crank shaft toward the cylinder head. The radial motion of the sleeves 66 is transformed into an oscillatory motion of the shaft 68 by any suitable mechanism. Thus, there may be ball bearings 70 associated with shaft 68 and extending into respective troughs 72 of sleeves 66. The troughs may lead in part around the axis of shaft 68 and in part along that axis whereby an axial movement of a sleeve 66 will cause an oscillation of the shaft 68 during at least a portion of the movement of the sleeve. The shape of the troughs determines the velocity and acceleration of the angular motion of shaft 68 as it turns in bushing 74.

The outer end of shaft 68 is connected to valve 40 so as to cause an oscillation of the valve which may be controlled as to velocity, etc., by that connection. The valve and cap 44 are permanently united and the latter may comprise a journal element in which a crank pin 76 attached to a rod may rotate, or the pin may be fixed to the cap and rotate in a journal element 78 which is attached to rod 80. These arrangements are equivalent in operation. If desired, there may be anti-friction members, as shown, between pin 76 and journal 78. The rod extends perpendicular to shaft 68 in a sleeve 82 with a bushing 84 therebetween. It will be seen that, as the shaft 68 is oscillated about its axis, rod 80 will be moved so that its axis rotates about the axis of shaft 68. Since one end of rod 80 is attached in one way or another to the valve cap 44, rod 80 is forced to slide in and out of sleeve 82 and, at the same time, pin 76 is forced to follow the circular path about the cylinder axis. In this way, the valve receives its oscillatory motion.

Fuel, for example oil, is brought to each cylinder by a respective conduit 86. The conduit has two outlets 88 and 90 which open into a cylindrical chamber 92 in which there is a rotatable cylindrical lining 94 which is provided with radial passageways 96 and 98. Passageway 96 has considerable angular extent around cylindrical lining 94. Passageway 98, axially spaced from passageway 96, is of considerable less angular extent and need only be large enough to register with outlet 90 at one position of the lining. The lining and a plunger 100, which extends thereinto movably, comprise a pump for supplying the fuel at high pressures to nozzle 58 at predetermined times as determined by the position of the crank shaft element 30.

The chamber 92 is formed by a general casing element 102 through which conduit 86 and plunger 100 may pass. The crank shaft element 30 is disk-shaped and has a cam 104 on its periphery. A roller 106 rides on the periphery of shaft element 30 and, in passing over lift 104, causes connecting element 108 and plunger 100 to be momentarily raised, giving the pumping stroke. At the beginning of that stroke, the interior of chamber 92 connects through passageway 96 to the fuel supply conduit 86 but it does not connect through outlet 90 because, as shown in Fig. 8a, passageway 98 is not then in registry with outlet 90. The pump vent 110 leads at all times from the pump chamber to passage 60 of the fuel nozzle.

Means are provided whereby the motion of the plunger causes the lining 94 to rotate so that, at a point in the stroke of plunger 100, the chamber 92 is connected to the inlet conduit 86, even after the plunger has passed inlet passageway 96 by means of the fact that passageway 98 can be brought around into registry with opening 90.

Such mechanism may comprise a key 112 fixed to lining 94 and extending into a spiral keyway 114 in plunger 100.

The operation of the pump is as follows. At the beginning of the stroke, supply conduit 86 is in communication with chamber 92 through passageway 96 and the outlet conduit 88. Passageway 98 and outlet conduit 90 are not in registry. The plunger begins to rise, closing passageway 96 and forcing the fuel out through vent 110. As the plunger moves into chamber 92, lining 94 is caused to rotate by the action of key 112 in slot 114. After a time, passageway 98 comes into registry with conduit outlet 90 and the high pressure is destroyed thereby.

It may be desired to deliver fuel for longer or shorter periods. The length of the period for delivery is controlled by the angular distance which passageway 98 has to turn before it comes into registry with outlet 90. The lining 94 may be set so that it has but a slight angle to turn through before that registry occurs. The setting of that lining is accomplished by the rotation, manually or otherwise, of a handle 116 which is keyed to plunger 100. In Fig. 8 there are shown four original positions of the lining with respect to the casing 102. It will be seen that if the lining is in the position shown in Fig. 8a, the plunger will have to move farther before passageway 98 and outlet 90 are in registry than will be the case if the original setting of the lining, as determined by handle 116, is that shown in Fig. 8d.

A scavenging chamber 101 (see Fig. 4) may be provided, extending away from each bore in which each plunger 100 operates. These chambers are, in each case, at a distance from chambers 92. They are connected by conduit 103 (see Fig. 1) to a pump (not shown).

The operation of the machine as a whole, i. e., as a Diesel engine, will be understood from the foregoing description of its several parts.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

Having described my invention, what I claim as new and desire to secure by Letters Patent is:

1. In an internal combustion engine, the combination comprising an oscillant valve for the control of egress of gases, a crank pin element journaled to said valve, a rod fixed to said pin and slidable in a sleeve, said sleeve being rotatable about an axis perpendicular to the axis of said sleeve, and means for rotating said sleeve.

2. In an internal combustion engine, the combination comprising an oscillant valve for the control of egress of gases, rotatable means, connecting means journaled to said valve and slidable in said rotatable means, and means for oscillating said rotatable means.

3. In an internal combustion engine, the combination comprising an oscillant valve for the control of egress of gases, power train means rotatable about an axis parallel with the axis of oscillation of said valve, connecting means journaled to said valve and slidable in said rotatable means, and means for oscillating said rotatable means.

4. A valve for an internal combustion engine, walls providing a precombustion chamber positioned centrally of said valve for delivery of fluid into said valve, said valve having an end adapted for delivery of fluid to the interior of an engine cylinder, means providing discharge openings through said valve, at least one of said openings extending nearer said end than does said chamber, said walls and said valve being rotatable together about an axis which extends in the general direction of the discharge of said chamber.

5. A rotatable cone valve for an internal combustion engine comprising means providing a precombustion chamber and a discharge orifice at one end thereof, means to supply fuel to the chamber, and a cone-shaped skirt attached at its smaller end to said means, and terminating in an outer edge extending substantially beyond the discharge orifice, said skirt having valve port openings extending therethrough substantially opposite the discharge orifice, for communication with exhaust passages.

6. A rotatable cone valve for an internal combustion engine comprising a dome-shaped shell defining a precombustion chamber therein with fuel admission means thereto, said shell having in the domed portion thereof a discharge orifice consisting of a plurality of slots extending at their exit sides substantially radially from the center thereof over an appreciable radial dimension of said domed portion, with the inner ends thereof meeting at the center and the outer ends thereof describing generally helical paths, and a cone-shaped skirt attached at its smaller end to the base of said shell and terminating in an outer edge extending substantially beyond the discharge orifice, said skirt having valve port openings extending therethrough substantially opposite the discharge orifice, for communication with exhaust passages.

7. A valve mechanism for an internal combustion engine comprising a circumambient structure having exhaust passages extending therethrough, means providing a precombustion chamber and a discharge orifice at one end of the chamber, means to supply fuel to the chamber, a skirt-shaped wall structure attached to said chamber, and extending in the general direction of discharge from the orifice and therebeyond and terminating in an outer edge, said skirt-shaped wall structure being nested with said first-mentioned structure to cooperate therewith upon relative rotary motion, said skirt-shaped wall structure having valve port openings extending therethrough, to communicate with the exhaust passages in certain angular positions of one structure relative to the other, said openings being located at least in part between the outer edge of said wall and the discharge orifice.

8. A valve mechanism for an internal combustion engine comprising a circumambient structure having an exhaust passage extending therethrough, means providing a precombustion chamber and a discharge orifice at one end of the chamber, means to supply fuel to the chamber, a skirt-shaped wall structure attached to said chamber and extending in the general direction of discharge from the orifice and therebeyond, and terminating in an outer edge, said skirt-shaped wall structure being nested with said first-mentioned structure to cooperate therewith upon relative rotary motion, and means providing a valve port opening extending through said wall opposite the exit end of the discharge opening, to communicate with the exhaust passage in certain angular positions of one structure relative to the other.

9. A rotatable valve for an internal combustion engine comprising means providing a precombustion chamber and a discharge orifice at one end of the chamber, means to supply fuel to the chamber, and a skirt-shaped wall attached to the other end of said chamber rotatable therewith, and extending in the general direction of discharge beyond the orifice with said chamber, means projecting from the point of attachment to within said wall and with the latter spaced circumambiently from the former, said wall having a plurality of valve port openings extending therethrough for communication with exhaust passages in valve seat structure, and located opposite the discharge orifice in circumambiently spaced relation with respect to each other.

EDWARD T. RODGERS.